United States Patent
Hill

[15] 3,694,804
[45] Sept. 26, 1972

[54] COOLANT LEVEL DETECTOR FOR ENGINE COOLING SYSTEM

[72] Inventor: Frederick Norman Hill, Anglesey, North Wales

[73] Assignee: Thomas Electronics Limited, Marple, Cheshire, England

[22] Filed: June 11, 1970

[21] Appl. No.: 45,530

[30] Foreign Application Priority Data

June 11, 1969 Great Britain..........29,069/69

[52] U.S. Cl.................340/59, 73/304 R, 123/41.15, 340/244 C
[51] Int. Cl. ...........................B60g 1/00, G01f 23/24
[58] Field of Search..340/59, 244 C, 81 R; 73/304 R; 123/41.15

[56] References Cited

UNITED STATES PATENTS

| | | |
|---|---|---|
| 3,163,843 | 12/1964 | Dieckamp...............340/244 C |
| 3,421,107 | 1/1969 | Keller.........................340/81 |
| 3,333,258 | 7/1967 | Walker et al...........340/244 C |
| 3,312,936 | 4/1967 | Huntzinger..................340/59 |

FOREIGN PATENTS OR APPLICATIONS 451,239 9/1948 Canada..................340/244 C Primary Examiner—John W. Caldwell
Assistant Examiner—Glen R. Swann, III
Attorney—Shoemaker & Mattare

[57] ABSTRACT

In a liquid level detector for an engine cooling system an oscillator is arranged to apply a continuous output signal to a probe located in a liquid coolant reservoir presenting to the oscillator a variable electrical impedance according to the liquid level therein and a relaxation oscillator is operative in response to signals from said oscillator and arranged to actuate an indicator device giving intermittent visual and/or audible warning when the surface of the liquid coolant falls to below a predetermined level; a clamp circuit is arranged to inhibit operation of the relaxation oscillator when the surface of the liquid coolant is at or above the predetermined level and thereby improve the noise immunity of the detector.

5 Claims, 4 Drawing Figures

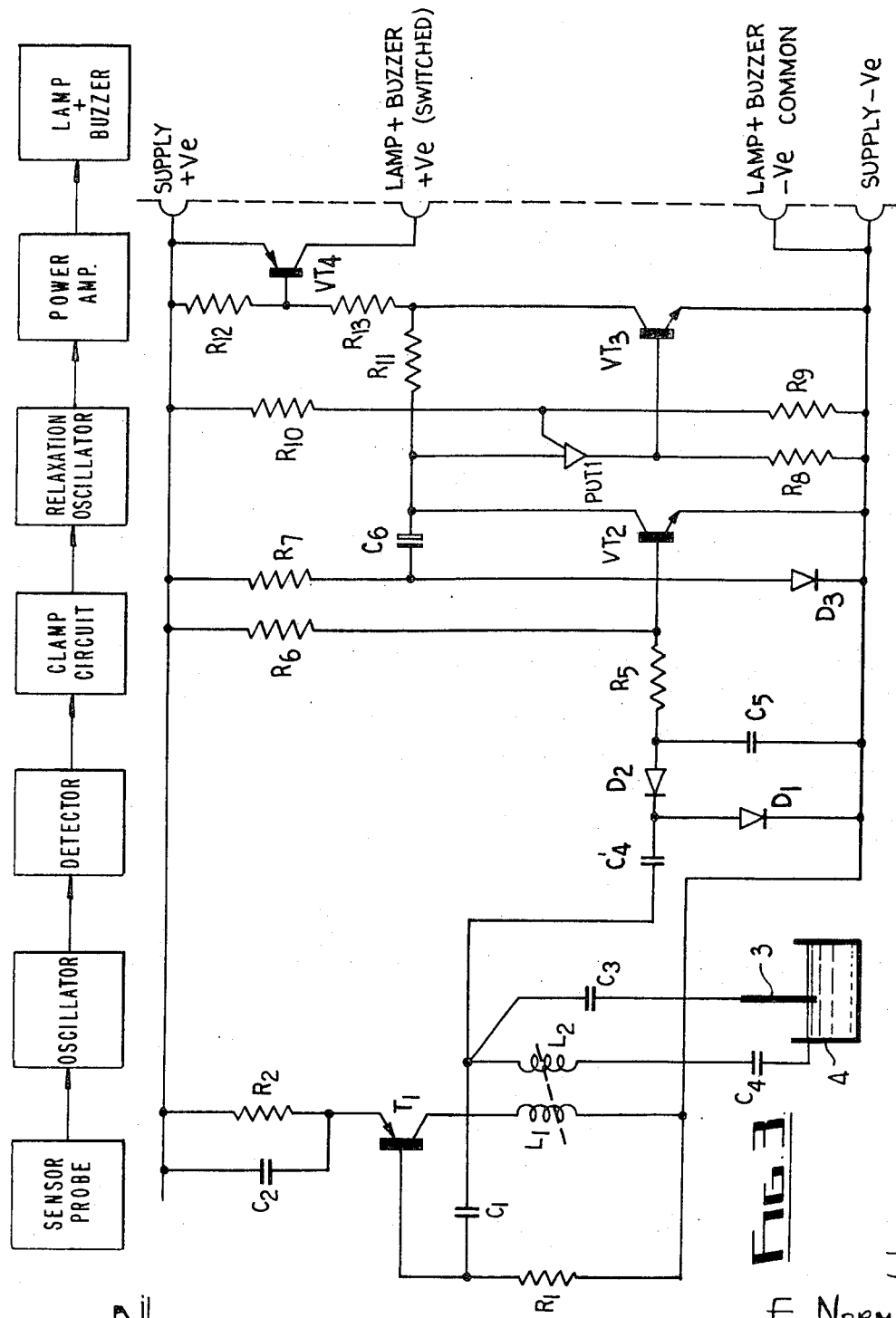

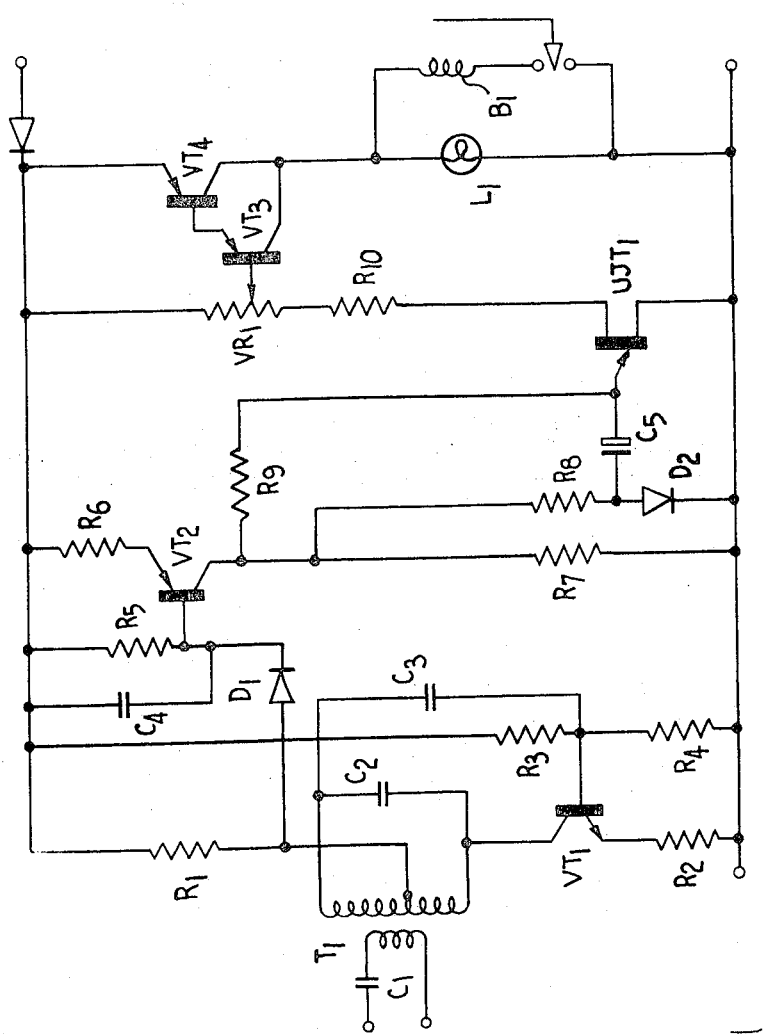

COOLANT LEVEL DETECTOR FOR ENGINE COOLING SYSTEM

This invention relates to liquid level detectors for detecting the departure of the surface of a liquid coolant, in a reservoir or an engine cooling system from a predetermined level.

According to the present invention there is provided a liquid level detector for detecting the departure of the surface of a liquid coolant in a reservoir of an engine cooling system from a predetermined level, comprising:

a first detection element in the form of a probe arranged to extend into the reservoir, a second detection element arranged for operative connection to the reservoir, an electrical impedance determined by the liquid present between said first and second detection elements and which varies in magnitude according to the liquid level in said reservoir, a first oscillator connected to the first and second detection elements and responsive to said electrical impedance therebetween to produce a first output signal when said electrical impedance reaches a magnitude corresponding to the departure of said liquid to below a predetermined level, a relaxation oscillator responsive to the first output of said first oscillator by producing a second output signal, indicator means responsive to the second output signal, of said relaxation oscillator by producing an intermittent indication or warning, a clamp circuit operative between said impedance and said relaxation oscillator and arranged to prevent operation of the relaxation oscillator when the surface of the liquid is at or above said predetermined level.

Several embodiments of the invention will now be described by way of example only, with reference to the accompanying drawings in which:

FIG. 2 shows a block schematic diagram of the principal circuit elements of the circuit of FIG. 3;

FIG. 3 shows a circuit diagram of one embodiment of a water level detector according to the invention incorporating the circuit of FIG. 1 together with, inter alia, a relaxation oscillator and clamp circuit for providing an intermittent warning signal;

FIG. 4 shows an alternative water level detector circuit according to the invention.

Figure 1:
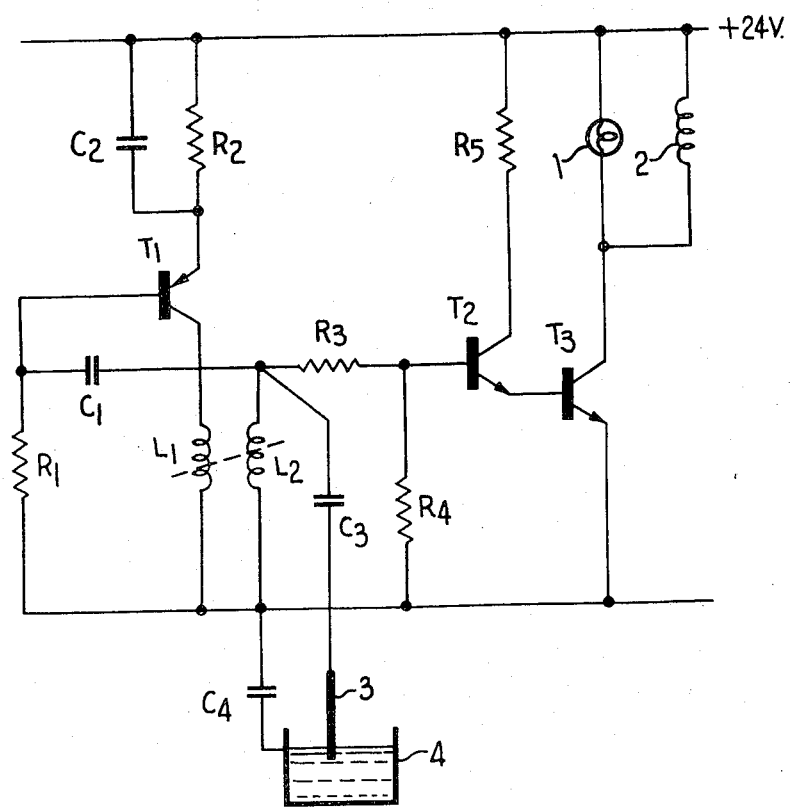
FIG. 1 shows a circuit diagram of a water level detector suitable for incorporation in the circuit of FIGS. 2 and 3.

The detector of FIG. 1 incorporates an oscillator comprising transistor $T_1$, resistors $R_1$ and $R_2$, capacitors $C_1$ and $C_2$, and air cored coils $L_1$ and $L_2$. The coils $L_1$ and $L_2$ are close coupled and coil $L_2$ is coupled to the base of the transistor $T_1$ by means of the capacitor $C_1$ to maintain the oscillations. The oscillator produces an alternating electrical output across a potential divider comprising resistors $R_3$ and $R_4$, and the potential at the junction of the resistors $R_3$ and $R_4$, is fed to the base of transistor $T_2$ of an operation means in the form of an amplification stage comprising transistors $T_2$ and $T_3$ and resistor $R_5$. An indicator means comprising a lamp 1 and a buzzer represented by an actuating solenoid coil 2 is connected in the collector lead Transistor $T_3$.

The oscillator output, appearing across the resistors $R_3$ and $R_4$, is also coupled to an electrode 3 arranged within the radiator 4 of the cooling system by means of capacitor $C_3$, and to the radiator 4, by means of capacitor $C_4$.

The electrode 3 terminates at a position in the radiator corresponding to the desired minimum level of water within the radiator.

When the water level is at or above the desired minimum level the water is in contact with the electrode and completes a first circuit element across the oscillator output. This circuit element, comprising capacitors $C_3$ and $C_4$ and the water, has an electrical impedance which is lower than the impedance of a second circuit element, comprising resistors $R_3$ and $R_4$ and the operation means, which is also across the oscillator output. With this arrangement there is only small voltage across resistor $R_4$, and this gives rise to a current flowing in the collector lead of transistor $T_3$ which is insufficient to actuate the indicator means.

When the water level falls below the predetermined level the said first circuit element is open circuited the loading or phase shift of the oscillator decreases and the voltage across resistor $R_4$ rises to a comparatively large value causing a current to flow in the collector lead of transistor $T_3$ of sufficient magnitude to actuate the indicator means.

The oscillator is arranged to produce an output having a frequency of sufficient magnitude to prevent polarization occurring within the radiator.

In the circuit described above the oscillator is maintained operational in all conditions and consequently components having poor tolerances, for example tolerances of ± 20 percent may be used.

In addition, the potential applied to the base of transistors $T_2$ is dependent only on the resistance of the said first circuit element and thus there is little tendency for spurious signals for example from nearby power supply lines, to effect actuation of the indicator means.

The coils $L_1$ and $L_2$ may be suitably selected to permit reliable operation of the detector despite comparatively wide fluctuations of supply voltage.

In the detector described above typical transistors which may be used are:

| | |
|---|---|
| $T_1$ | D29A5 (SESCO) |
| $T_2, T_3$ | 2N3415 (SESCO) | and typical values of the other components are as follows:

| | | | |
|---|---|---|---|
| $R_1$ | 22 M. ohms | $R_2$ | 1.8 K. Ohms |
| $R_3$ | 15 K. ohms | $R_4$ | 6.8 K. ohms |
| $R_5$ | 1 K. ohms | | |
| $C_1$ | 0.01 µF | $C_2$ | 250 pF |
| $C_3$ | 0.1 µF | $C_4$ | 0.1 µF |
| Indicator Lamp | | 24v. 2.8 w. | |
| Indicator Buzzer | | 350 ohms | |

With these components the oscillator frequency is of the order of 965 Kc/s.

The circuit described above provides a reliable and inexpensive coolant level detector for a motor vehicle cooling system, and is incorporated in the detector circuit shown in FIGS. 2 and 3.

This detector comprises an oscillator circuit identical to that shown in FIG. 1 connected to an operating means including a detector circuit comprising diodes $D_1$, $D_2$ and capacitors $C_4'$, and $C_5$, a clamp circuit comprising resistors $R_n$, $R_6$ and transistor VT2, a relaxation oscillator comprising resistors $R_7$, $R_8$, $R_9$, $R_{10}$, $R_{11}$, capacitor $C_6$ and unijunction transistor $PUT_1$, and a power output amplifier comprising transistors $VT_3$, $VT_4$, and resistors $R_{12}$, $R_{13}$. The operating means is arranged to control operation of a lamp and a buzzer.

With the probe covered oscillation is at a very low level, the voltage across capacitor $C_5$ is at a very low level, the current flowing through resistor $R_6$ holds transistor $VT_2$ on and the voltage at the collector of transistor $VT_2$ is near to the negative supply voltage thereby inhibiting the relaxation oscillator and transistors $VT_3$ and $VT_4$ are switched off and the indicator means does not operate.

When the probe is uncovered oscillation is at a high level and the output from the oscillator is d.c.-restored by $C_4'$ and $D_1$ and peak rectified by $D_2$ and $C_5$. This produces a voltage at the junction of $C_5$ and $R_5$ which is negative with respect to supply negative. This causes transistor $VT_2$ to turn off and removes the clamp on the positive plate of $C_6$ which charges towards the supply positive rail via $R_{11}$, $R_{12}$, $R_{13}$ and $D_3$. When the voltage at the anode of the programmable unijunction transistor $PUT_1$ reaches the peak voltage defined by $R_9$ and $R_{10}$, $PUT_1$ fires which causes the positive plate of $C_6$ to go to a voltage near to supply negative. This negative excursion is reflected on to the negative plate of $C_6$ and diode $D_3$ is reverse biassed. Current then flows through $R_7$, $C_6$, the anode and cathode of $PUT_1$ and the base of $VT_3$, $VT_3$ therefore turns on and the potential at the collector of $VT_3$ goes near to supply negative. Transistor $VT_4$ turns on and the lamp and buzzer are energized. At the same time current through $R_{11}$ is reduced and $PUT_1$ is only held on by the current through $R_7$ and $C_6$. When the voltage on the negative plate of $C_6$ reaches approximately +0.6V with respect to the supply negative, diode $D_3$ conducts and the current which was flowing through $C_6$ is diverted through $D_3$. Thus $PUT_1$ turns off, $VT_3$ turns off and $VT_4$ turns off. The lamp and buzzer are de-energized $C_6$ now starts to charge through $R_{11}$, $R_{12}$ and $R_{13}$ and the flashing cycle is repeated.

With this arrangement the relaxation oscillator and the clamp circuit act to prevent spurious operation due to surges in adjacent electrical systems.

The detector of FIG. 4 comprises an oscillator circuit comprising coupled, ferrite-cored coils $T_1$, resistors $R_1 R_2$, $R_3$, $R_4$, capacitors $C_2$, $C_3$, and transistor $VT_1$, one of the coils being connected in series with a capacitor $C_1$ the probe and the reservoir via a capacitor $C_1$, and operation means including a detector circuit comprising diode $D_1$, capacitor $C_4$ and resistor $R_5$, a switch circuit comprising resistors $R_6$ and $R_7$ and transistor $VT_2$, a relaxation oscillator comprising resistors $R_8$, $R_9$, $R_{10}$, diode $D_2$, capacitor $C_5$, unijunction transistor $UJT_1$ and variable resistance $VR_1$, and a power output amplifier comprising transistors $VT_3$ and $VT_4$.

When the probe is covered oscillation is at a very low level, a very small voltage is developed across $C_4$, $R_5$, and $VT_2$ is turned off. This voltage at the collector of $VT_2$ is at or near negative supply voltage and therefore no current flows through $R_8$ and $R_9$ and $UJT_1$, $VT_3$, and $VT_4$ are turned off.

When the probe is uncovered, oscillation is at a high level and the voltage developed across $C_4$, $R_5$ turns $VT_2$ on. The voltage at the collector of $VT_2$ is near to supply positive and current flows via $R_9$, $C_5$ and $D_2$ to charge $C_5$. When the voltage on the positive plate of $C_5$ reaches the peak current point of $UJT_1$ this fires. The voltage at the base of $VT_3$ goes negative and $VT_3$ and $VT_4$ turn on energizing lamp $L_1$ and buzzer $B_1$. At the same time the emitter of $UJT_1$ goes negative, this negative voltage is reflected via $C_5$ to reverse bias $D_2$, and $C_5$ starts to charge via $R_8$ and the emitter base junction. Thus, the total current flowing in the emitter base junction is the sum of the current flowing through $R_8$ and $R_9$. When the voltage on the negative plate of $C_5$ reaches approximately +0.6V with respect of negative supply voltage, $D_2$ conducts and the current flowing in $R_8$ is diverted through $D_2$. The unijunction transistor turns off $VT_3$ and $VT_4$ thereby de-energizing the lamp and the buzzer, $C_5$ again charges via $R_9$ and the cycle is repeated.

What we claim is:

1. A liquid level detector for detecting the departure of the surface of a liquid coolant in a reservoir of an engine cooling system from a predetermined level, comprising:

a first detection element in the form of a probe arranged to extend into the reservoir, a second detection element arranged for operative connection to the reservoir, an electrical impedance determined by the liquid present between said first and second detection elements and which varies in magnitude according to the liquid level in said reservoir, a first oscillator connected to the first and second detection elements and responsive to said electrical impedance therebetween to produce a first output signal when said electrical impedance reaches a magnitude corresponding to the departure of said liquid to below a predetermined level, a relaxation oscillator responsive to the first output of said first oscillator by producing a second output signal, indicator means responsive to the second output signal of said relaxation oscillator by producing an intermittent indicating or warning, a clamp circuit operative between said impedance and said relaxation oscillator and arranged to prevent operation of the relaxation oscillator when the surface of the liquid is at or above said predetermined level.

2. A liquid level detector as claimed in claim 1 wherein said first oscillator includes two coupled air coils.

3. A liquid level detector according to claim 1 wherein said first oscillator includes two coupled ferrite cored coils.

4. A liquid level detector according to claim 2 wherein the relaxation oscillator includes a unijunction transistor.

5. An engine cooling system incorporating a first detection element in the form of a probe arranged to extend into the reservoir, a second detection element arranged for operative connection to the reservoir, an electrical impedance determined by the liquid present between said first and second detection elements and which varies in magnitude according to the liquid level in sail reservoir, a first oscillator connected to the first and second detection elements and responsive to said electrical impedance therebetween to produce a first output signal when said electrical impedance reaches a magnitude corresponding to the departure of said liquid to below a predetermined level, a relaxation oscillator responsive to the first output of said first oscillator by producing a second output signal, indicator means responsive to the second output signal of said relaxation oscillator by producing an intermittent indication or warning, a clamp circuit operative between said impedance and said relaxation oscillator and arranged to prevent operation of the relaxation oscillator when the surface of the liquid is at or above the predetermined level.

* * * * *